United States Patent
Avrahami

(10) Patent No.: US 9,262,015 B2
(45) Date of Patent: Feb. 16, 2016

(54) SYSTEM FOR PORTABLE TANGIBLE INTERACTION

(75) Inventor: Daniel Avrahami, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 546 days.

(21) Appl. No.: 12/824,448

(22) Filed: Jun. 28, 2010

(65) Prior Publication Data

US 2011/0316767 A1  Dec. 29, 2011

(51) Int. Cl.
  *G06F 3/042* (2006.01)
  *G06F 3/03* (2006.01)
  *G06F 1/16* (2006.01)

(52) U.S. Cl.
  CPC ............ *G06F 3/0425* (2013.01); *G06F 1/1626* (2013.01); *G06F 1/1686* (2013.01)

(58) Field of Classification Search
  CPC ........... G06F 3/01; G06F 3/011; G06F 3/017; G06F 3/0425; G06F 1/1626; G06F 1/1686
  USPC .......... 345/156, 173–184; 348/135, 157, 159; 353/52, 28; 463/4, 14, 48
  See application file for complete search history.

(56) References Cited

U.S. PATENT DOCUMENTS

| | | | | |
|---|---|---|---|---|
| 4,988,981 A * | 1/1991 | Zimmerman et al. | ........ | 345/158 |
| 5,649,706 A * | 7/1997 | Treat et al. | .......... | 273/358 |
| 6,005,547 A * | 12/1999 | Newman et al. | ........... | 345/156 |
| 6,181,343 B1 | 1/2001 | Lyons | | |
| 6,917,301 B2 * | 7/2005 | Blum et al. | ............. | 340/815.4 |
| 7,414,617 B2 * | 8/2008 | Ogawa | ........... | 345/173 |
| 8,035,624 B2 * | 10/2011 | Bell | .......... | G06F 3/011 |
| | | | | 345/175 |
| 8,103,109 B2 * | 1/2012 | Winn | ........ | G06F 3/017 |
| | | | | 382/128 |
| 8,325,472 B2 * | 12/2012 | Wang | ........... | G06F 1/1616 |
| | | | | 312/223.1 |
| 8,368,646 B2 * | 2/2013 | Welland | ........... | 345/158 |
| 8,382,295 B1 * | 2/2013 | Kim | ............ | B42D 3/123 |
| | | | | 348/552 |
| 8,581,852 B2 * | 11/2013 | Izadi | ............... | G06F 3/0425 |
| | | | | 345/173 |
| 9,044,863 B2 * | 6/2015 | Mead et al. | | |
| 2004/0108990 A1 * | 6/2004 | Lieberman et al. | ........... | 345/156 |
| 2004/0119602 A1 * | 6/2004 | Blum et al. | ............. | 340/815.4 |

(Continued)

FOREIGN PATENT DOCUMENTS

| CN | 101303634 | 11/2008 |
|---|---|---|
| CN | 101305401 | 11/2008 |

(Continued)

OTHER PUBLICATIONS

Kong, Young S., et al., "Development of the FishBowl Game Employing a Tabletop Tiled Display Coupling With Mobile Interfaces", Journal of Korea Game Society, vol. 10, No. 2, (Apr. 31, 2010), 57-66. English language translation.*

(Continued)

*Primary Examiner* — Julie Anne Watko
(74) *Attorney, Agent, or Firm* — Blakely, Sokoloff, Taylor & Zafman LLP

(57) ABSTRACT

Embodiments of the invention describe a system utilizing at least one camera and a display to create an object and context aware system. Embodiments of the invention may utilize the camera to sense a system's surroundings and use recognition logic or modules to detect and recognize objects on and around the system. System applications may further act on the sensed data and use the display of the system to provide visual feedback and interactive elements as a means to interact with the system user.

16 Claims, 6 Drawing Sheets

(56) References Cited

U.S. PATENT DOCUMENTS

| | | | |
|---|---|---|---|
| 2004/0141162 A1* | 7/2004 | Olbrich | 353/119 |
| 2005/0012720 A1* | 1/2005 | Pryor | 345/168 |
| 2005/0122308 A1* | 6/2005 | Bell et al. | 345/156 |
| 2006/0063574 A1 | 3/2006 | Richardson et al. | |
| 2006/0132432 A1 | 6/2006 | Bell | |
| 2007/0152986 A1 | 7/2007 | Ogawa | |
| 2008/0062257 A1* | 3/2008 | Corson | 348/47 |
| 2008/0278462 A1* | 11/2008 | Chang | 345/179 |
| 2008/0281851 A1* | 11/2008 | Izadi et al. | 707/102 |
| 2010/0265215 A1* | 10/2010 | Lai | 345/175 |
| 2010/0271333 A1* | 10/2010 | Lai | 345/175 |
| 2011/0046935 A1* | 2/2011 | Sugaya | 703/11 |
| 2013/0120319 A1* | 5/2013 | Givon | 345/175 |
| 2013/0321346 A1* | 12/2013 | Tyler et al. | 345/175 |

FOREIGN PATENT DOCUMENTS

| | | |
|---|---|---|
| JP | 2002052246 A * | 2/2002 |
| JP | 2007038000 | 2/2007 |
| JP | 2008131174 | 6/2008 |
| JP | 2009188780 | 8/2009 |
| TW | 543323 | 7/2003 |
| TW | M380817 | 4/2010 |
| TW | M380817 U1 * | 5/2010 |
| WO | WO 02/29722 A2 * | 4/2002 |
| WO | WO-2006078996 | 7/2006 |
| WO | WO-2007055865 | 5/2007 |
| WO | WO-2009/078993 | 6/2009 |
| WO | WO-2009/141913 | 11/2009 |
| WO | WO 2009141913 A1 * | 11/2009 |

OTHER PUBLICATIONS

Rehg et al, "DigitEyes: vision-based human hand tracking", Technical Report CMU-CS-93-220, Carnegie Mellon School of Computer Science, Pittsburgh, Pa. 15213, 1983.*

Antle, Alissa N., et al., "Hands on What?: Comparing Children's Mouse-based and Tangible-based Interaction", *In Proc. IDC '09*. 80-88, (Jun. 2009), pp. 80-88.

Baudisch, Patrick, et al., "Halo: A Technique for Visualizing Off-screen Objects", *In Proc. CHI'03. ACM*, New York, NY, (Apr. 2003), pp. 481-488.

Butler, Alex, et al., "SideSight: Multi-"touch" Interaction Around Small Devices", *In Proc UIST'08. ACM*, New York, NY, (2008), pp. 201-204.

Gustafson, Sean, et al., "Wedge: Clutter-free Visualization of Off-screen Locations", *In Proc. CHI'08*, (2008), pp. 787-796.

Harrison, Chris, et al., "Abracadabra: Wireless, High-precision, and Unpowered Finger Input for Very Small Mobile Devices", *In Proc. UIST'09*, (2009), pp. 121-124.

Kane, Shaun K., et al., "Bonfire: A Nomadic System for Hybrid Laptop-tabletop Interaction", *In Proc. UIST'09*, (2009), pp. 129-138.

Patten, James, et al., "Sensetable: A Wireless Object Tracking Platform for Tangible User Interfaces", *In Proc. CHI'01*, (2001), pp. 253-260.

Scarlatos, Lori L., "TICLE: Using Multimedia Multimodal Guidance to Enhance Learning", *Information Sciences 140*, (2002), pp. 85-103.

Shaer, Orit, et al., "A Specification Paradigm for the Design and Implementation of Tangible User Interfaces", *ACM Transactions on Computer-Human Interaction*, (Jun. 2009), 1-39.

Stauffer, Chris, et al., "Adaptive Background Mixture Models for Real TimeTracking", *In Computer Vision and Pattern Recognition*, (1999), pp. 1-7.

Ullmer, Brygg, et al., "The metaDESK: Models and Prototypes for Tangible User Interfaces", *In Proc. UIST'97*, (1997), pp. 223-232.

Wilson, Andrew W., "Bringing Physics to the Surface", *In Proc. UIST'08. ACM*, (2008), 67-76.

Wilson, Andrew D., "PlayAnywhere: A Compact Interactive Tabletop Projection-vision System", *In Proc. UIST'05*, (2005), pp. 83-92.

Zuckerman, Oren, et al., "Extending Tangible Interfaces for Education: Digital Montessoriinspired Manipulatives", *In Proc. CHI'05, ACM Press*, (2005), pp. 859-868.

"PCT, ISR/WO of the International Searching Authority for Applicatino No. PCT/US2011/040649", (Feb. 24, 2012), Whole Document.

"PCT, ISR/WO of the International Searching Authority for Application No. PCT/US2011/040649", (Feb. 24, 2012), Whole Document.

Non-Final Office Action for Japanese Patent Application No. 2013-515501, mailed Nov. 19, 2013, 3 pages.

First Office Action for Chinese Patent Application No. 201180002819.6, mailed Mar. 5, 2014, 21 pages.

Office Action for Korean Patent Application No. 10-2012-7033995, mailed Feb. 24, 2014, 10 pages.

Kong, Young S., et al., "Development of the FishBowl Game Employing a Tabletop Tiled Display Coupling With Mobile Interfaces", *Journal of Korea Game Society*, vol. 10, No. 2, (Apr. 31, 2010), 57-66.

Notice of Final Rejection mailed Aug. 21, 2014 (+ English translation), in Korean Patent Application No. 10-2012-7033995, 6 pages.

Second Office Action dated Sep. 26, 2014 (+ English translation), in Chinese Patent Application No. 201180002819.6, 8 pages.

Official Communication dated Apr. 20, 2015 (+ English translation), in Taiwanese Patent Application No. 100122011, 14 pages.

Official Letter dated Oct. 22, 2015, in Taiwan Patent Application No. 100122011, 14 pages.

\* cited by examiner

SYSTEM FOR PORTABLE TANGIBLE INTERACTION

FIELD

Embodiments of the present invention generally pertain to devices and methods to provide enhanced computer device interaction and more specifically to processing object interaction with augmented mobile computer device systems.

BACKGROUND

The increasing processing capabilities of mobile computer systems have created the improved ability to understand and react to physical objects near said systems. System users' contexts may also be used to provide a richer interaction experience.

Creating a system with the ability to track objects, act upon them, and provide feedback would significantly increase the value of mobile computers to end users. Tabletop systems have been proposed and developed over the years to provide many of these benefits; however, these systems are typically large and thus not mobile nor personal. One of the reasons for the limitations of prior art solutions such as tabletop systems is the requirement of a large device footprint; such devices utilize additional hardware beneath the tabletop surface in order to process activity on the surface as interactions with the system.

Thus, no current solutions exist for providing enhanced user and object interaction for a mobile computer system that do not require additional display capabilities (e.g., an additional screen, a projector), wherein the mechanisms to enhance user and object interaction do not affect the nomadic characteristics of the mobile computing system.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
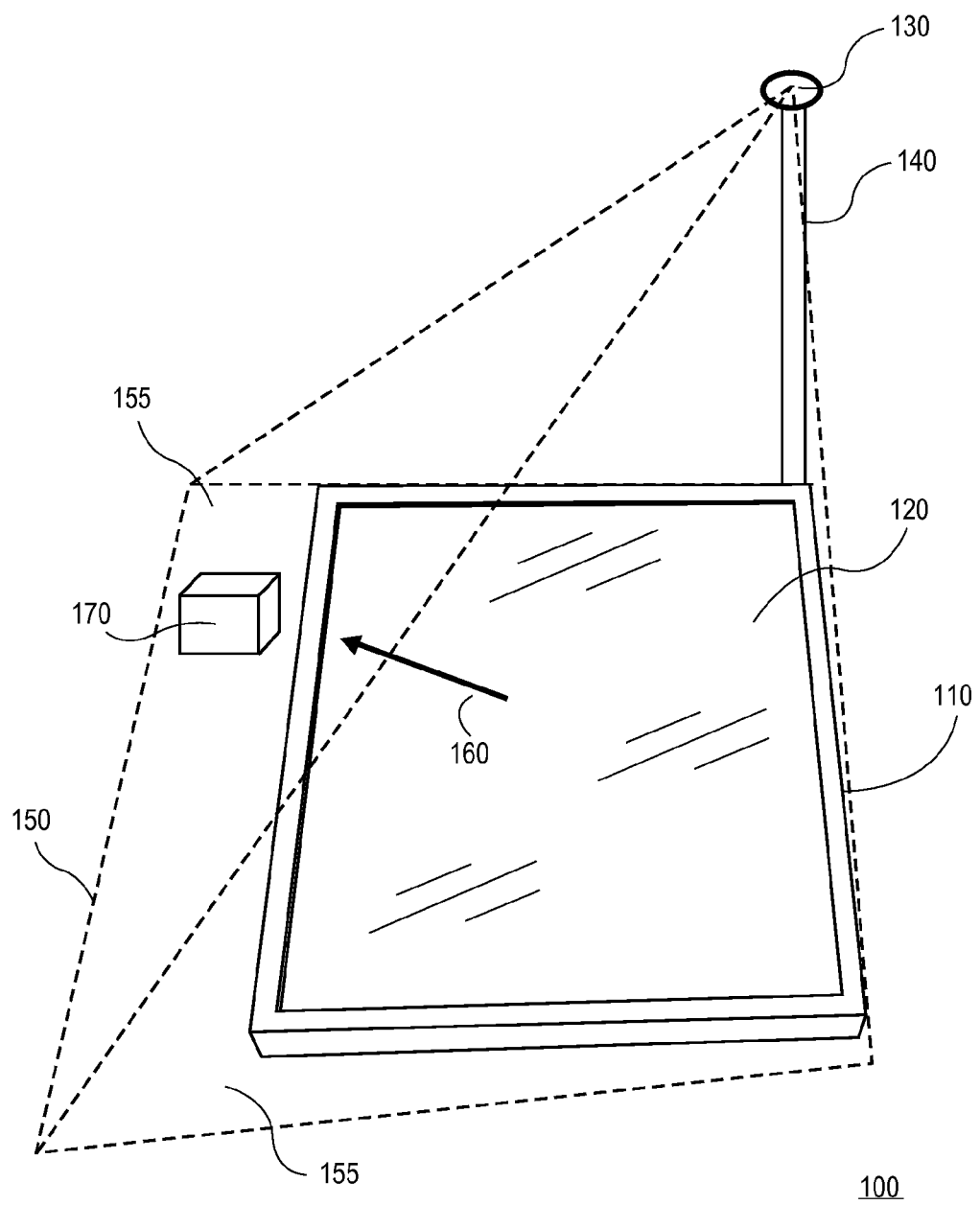
FIG. 1 is a block diagram of an embodiment of the invention.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe a system utilizing at least one camera and a display screen to create an object and context aware system. More specifically, embodiments of the invention utilize cameras and sensors to sense the system's surroundings and use recognition logic or modules to detect and recognize objects on and around the system. Said recognition logic or modules may further infer the state of system user(s) and their immediate environment based on the sensed data and any historical context or information it may have about the user. Applications may further act on the sensed data and use the display screen of the system to provide visual feedback and interactive elements (such as buttons, dials, sliders) as a means to interact with the system user(s).

Embodiments of the invention thus provide an object-aware mobile table-top system. Embodiments of the invention may utilize a ubiquitous stable-surface-based platform (e.g., a tablet computer or a convertible tablet) to get nomadic (as opposed to fixed) functionality. Embodiments of the invention may utilize cameras/sensors operatively coupled to the tablet computer to avoid environmental instrumentation (as opposed to cameras and projectors mounted on the ceiling). Integration of these cameras/sensors provides a self-sufficient highly portable, but immersive and inexpensive functionality. Embodiments of the invention utilize a camera positioned above the display surface of a mobile computer (e.g., a tablet computer), thus enabling the detection of objects off the screen (this detection is not be possible with a camera or sensor positioned underneath the display surface). Said camera may be integrated with the mobile device, or fastened to the mobile device using any means that may position the camera to view the display surface of the device.

Processing related to object awareness may be executed via logic or modules. Software modules may run on the system alone or alternately run on a combination of a networked systems and a back-end server. The functionality of said logic/modules is to parse object, user, and environmental states from the sensor data, and decide how to interact with the user (using the display/actuators of the system itself). The above processing functionality will include: basic frame capture, rectification and lighting correction; image segmentation and feature extraction; perception code to recognize object locations/state and user hands/location; gestures made by users with their hands; and optical character recognition (OCR), handwriting, and barcode recognition to extract text from objects and documents.

FIG. 1 is a block diagram of an embodiment of the invention. System 100 includes tablet computer 110. Tablet computer 110 is used as an example of a mobile computer system including display surface 120 that may be laid flat with respect to a supporting surface (e.g., a tabletop). It is to be understood that tablet computer 110 is one example of a device utilizing an embodiment of the invention, and it will be further understood some functions of tablet computers (e.g., a touchscreen display) are not necessarily required by embodiments of the invention.

System 100 may further include camera 130 positioned above display surface 120. In this embodiment, camera 130 is operatively coupled to tablet computer 110 via arm 140 rotationally extendable from tablet computer 110.

In one embodiment, camera 130 is positioned to capture visual data within target area 150. As illustrated in FIG. 1, target area 150 includes display surface 120 and areas 155 outside the display surface.

Tablet computer 110 may further execute an application that generates graphical image 160 to be displayed. Said application may also, via camera 130, identify object 170 within target area 150 via any perception algorithm known in the art. Said object may appear anywhere within target area 150 (i.e., on display surface 120 and area 155). Said application may process an interaction of object 170 with graphical image 160 produced by an application.

In this example, object 170 appears off of display surface 120, but within sub-area 155 of target area 150. The application executing on tablet computer 110 may orientate graphical image (arrow) 160 to identify the position of object 170 within target area 150. In this embodiment, graphical image 160 is generated based on the angle between object 170 and the center of screen 120.

Thus, embodiments of the invention may utilize a screen of a computing device to convey a perception of an object and user state, provide feedback to user on actions, and offer choices to the user to either manipulate physical objects or interact with digital on-screen elements.

Figure 2:
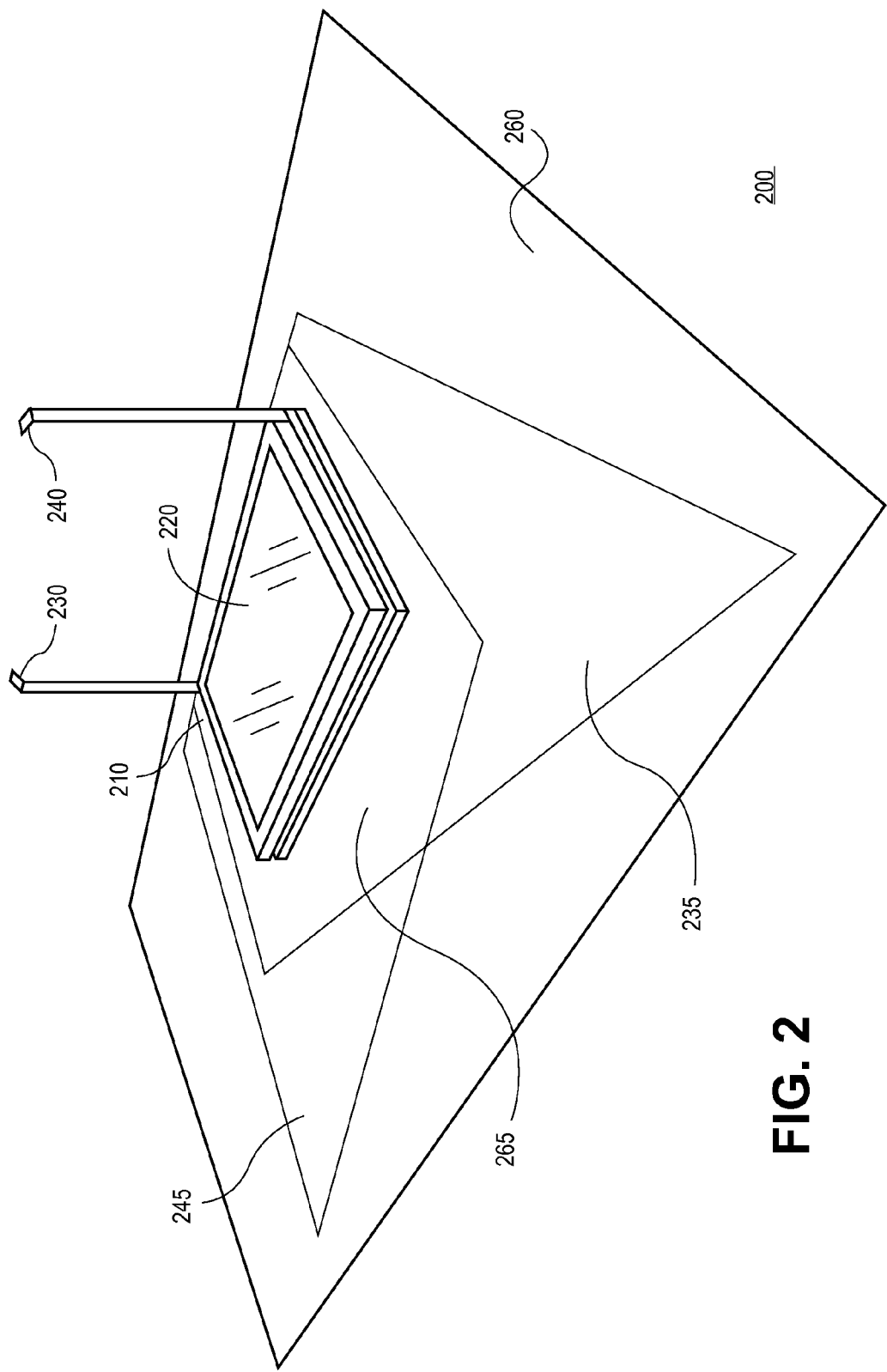
FIG. 2 is a block diagram of an embodiment of the invention.

FIG. 2 is a block diagram of an embodiment of the invention utilizing two cameras. System 200 includes tablet computer 210, including display surface 220. System 200 further includes cameras 230 and 240 positioned upright with respect to display surface 220. With mobile and ultra-mobile devices, screen real-estate often makes it impossible to accommodate a user's hands or fingers without obstructing the digital content on the screen. The use of multiple cameras provides a large interaction space despite the limited screen area provided by tablet computer 210. The physical design of system 200 to include cameras 230 and 240 enables it to view and respond to users' interactions with objects on the surface surrounding the tablet (i.e., the combination of target areas 235 and 245). Thus, the input space of system 200 (i.e., what the system sees) is significantly larger than its output space (limited to the bounds of screen 220).

To avoid cameras 230 and 240 accidentally recognizing virtual elements shown on tablet screen 220, linear polarizing filters may be applied to screen 220 and the cameras (most LCD screens are linearly polarized; however in many tablets, the touch-sensitive element diffuses the light). In one embodiment, the polarizing filters for cameras 230 and 240 are rotatable to avoid the need to pre-compute the filter rotation needed to block the view of screen 220 (rotating the filter to the correct alignment needs to be done only once).

Prior to use, the system 200 may be calibrated in order to generate different camera views from cameras 230 and 240 and to deliver correct object positions. In one embodiment, system calibration consists of three operations each of which need to be performed once. In the first operation, the four corners of screen 220 are manually selected by the user, once for each camera. Using the selected corners, a homography is computed for each camera that is later used for translating from camera view to the plane of screen 220. Alternatively, visual markers at the screen corners can be automatically deleted by the system. The homography may be stored on file and loaded automatically whenever system 200 starts up.

After the first calibration operation, an object placed on screen 220 may receive the same coordinates from both cameras 230 and 240; however, an object placed on table surface 260 (i.e., within either target area 235 and 245) will receive different coordinates from the two cameras because the plane of the tablet screen is raised up from the plane of surface 260.

Thus, in the second calibration operation, a single physical calibration marker is placed on surface 260 within overlapping area 265 between cameras 230 and 240 (at this point, system 200 will observe two markers on the table). Because system 200 is told that there is only one marker on surface 260, it computes a correction offset that should be applied to the two objects it is seeing for their centers to align. The offset is stored and is consequently applied to the coordinates of objects that are outside the bezel of tablet 210. After the second calibration operation, a single object in the cameras' overlap (i.e., area 265) will have overlapping coordinates and will be correctly reported by the vision system only once.

In a third operation, a mapping between the vision system coordinates and the application space coordinates is established. The calibration marker from the previous operation is placed at the four corners of the user application space. Using the coordinates returned by the vision system for the marker at each corner, a coordinate transformation is computed, stored, and is later used by applications of the system.

Figure 3:
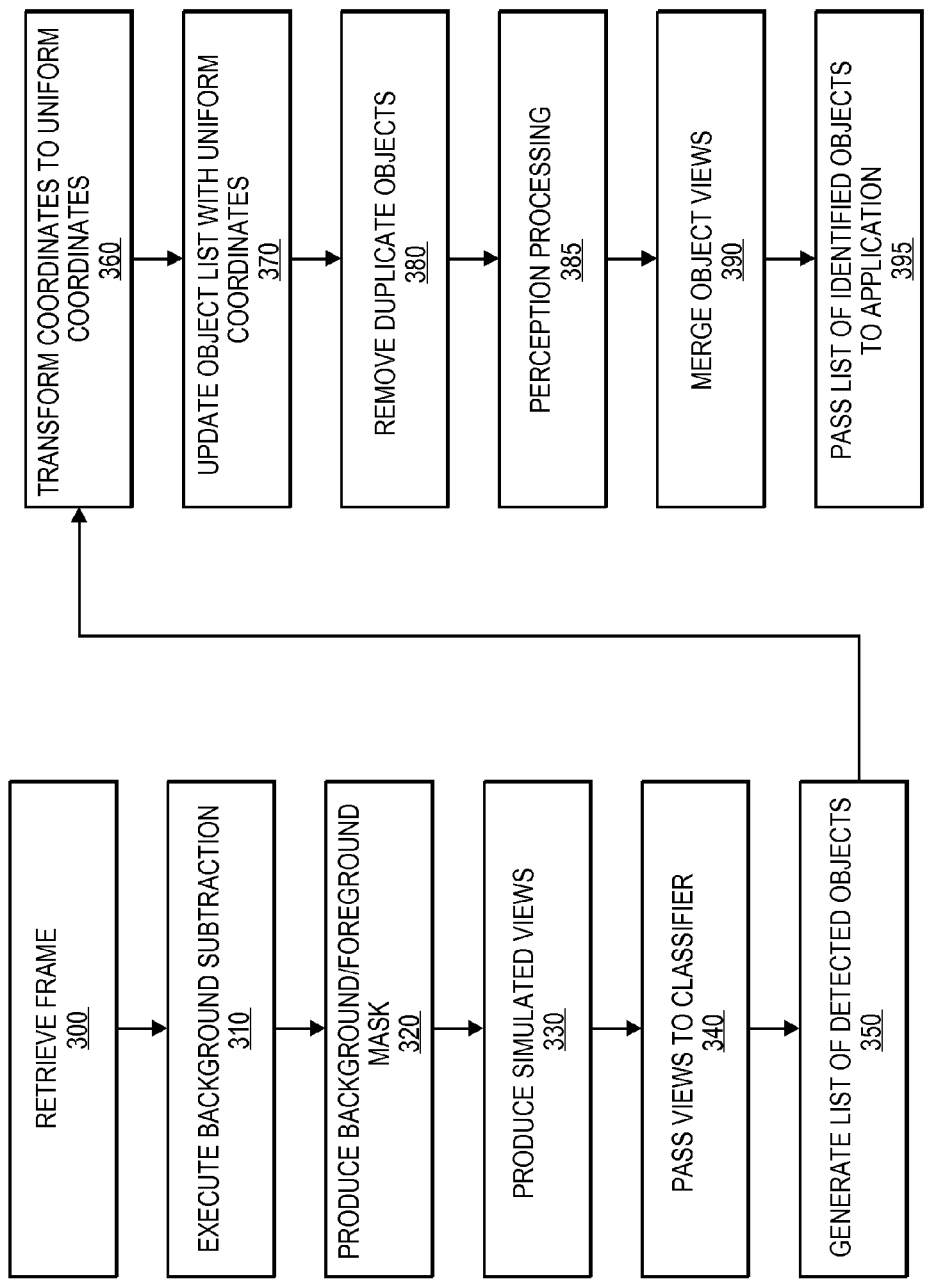
FIG. 3 is a flow diagram of an embodiment of the invention.

FIG. 3 is a flow diagram of an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

A frame is retrieved from at least one camera device, 300. In one embodiment, at least two cameras are utilized to provide a larger target input area. A background subtraction is executed of the retrieved frame, 310. In one embodiment, a Gaussian Mixture Models approach is utilized for background subtraction, with a dedicated model for each camera. When background subtraction is applied, a background/foreground mask associated with the raw camera frame is produced, 320.

Using calibration points identified at system setup, a set of simulated views to be used for object detection is produced, 330. In one embodiment, three simulated views are produced. The first comprises a Screen and Bezel View including a rectified view of the tablet screen and bezel and useful for performing more precise detection of objects placed on the tablet. The second view comprises a Table view including a rectified view of the tablet screen and surrounding surface and is computed such that the tablet screen occupies one of the top quadrants of the rectified view (depending on whether a left or right camera is used). The third view comprises a screen view, including a rectified view of the tablet screen only. If background subtraction is used, a View Module will distort the background/foreground mask received with the raw camera frame such that it matches the simulated view.

In one embodiment, the resolution of each of the above views (Raw, Screen and Bezel, and Table) is independent and may be changed depending primarily on the details of objects that need to be detected.

In one embodiment, a system includes a list of machine-learning classifiers corresponding to one of the above produced views and responsible for vision-based object recognition. Each of these views is passed to their respective classifier, 340. These views may be passed with or without background subtraction. Each classifier then returns a list of detected objects (if any), 350.

It is to be understood that because different views may have different resolutions and coordinate systems in relation to the tablet screen, the coordinates of each object must be transformed into a uniform coordinate system prior to passing the objects to the Camera Module, 360. In one embodiment, the coordinates of each detected object conform to the tablets' coordinate system, such that an object placed at the top-left of the tablet screen will have a coordinate of, for example, (0,0), and an object placed at the bottom right corner of the tablet screen will have a coordinate of, for example, (1280,800). In this example, at the end of this operation objects to the left of the tablet will have negative horizontal coordinates, objects in front of the tablet will have vertical coordinates greater than 800, and objects to the right of the tablet will have horizontal coordinates greater than 1280. Converging on this single coordinate system allows for a straightforward determination as to whether an object is on or off the screen, and one or more visualizations may be chosen appropriately. A list of objects may then be each updated with their associated coordinates, 370.

The system may process more than one set of objects classified on different views with potential redundancies; however, each object must be reported at most once to the output system. Thus, the lists from the different views are analyzed and duplicates of objects that occur in multiple lists are removed, 380. Duplicates are determined as objects that have the same template name and for which the bounding boxes overlap by more than, for example, 75%. In one embodiment, when duplicates are found, the system gives preference to objects classified on the higher resolution Screen and Bezel view over those classified on the Table view. The single list of objects is then passed for perception processing, 385.

Similar to the above operation, objects returned from the two cameras are merged, 390. It is to be understood that, unlike merging objects from different views of the same camera, a single object detected by both cameras may not have perfect overlap between the views. In fact, for any 3D object, it will likely not be the case. In one embodiment of the invention, the overlapping area for an object seen by both cameras is used as the possible base of the object. For overlapping objects, only the intersecting area may be reported to an output subsystem to approximate an object's touch point with the surface and provide feedback at the appropriate position.

Objects within the view of the system cameras are identified and passed to an application for subsequent processing, 395. Thus, the system's input space (what can be seen by the cameras) is much larger than its output space (the extent of the tablet screen).

Applications utilizing the above described increased input space may convey the presence of an off-screen object and manipulators may be applied to any representation for conveying the distance of the object from the tablet.

In one embodiment, an arrow is drawn from the center of the tablet screen in the direction of the object that is on the table. The thickness of the arrow may be used to indicate and update an object's distance from the tablet. For example, arrow thickness may decrease as an object's distance increases. An alpha blend value may also be used to indicate an object's distance from the tablet. This visualization technique changes the alpha value of representation based on the object's distance from the screen. When the object is touching the screen, the alpha value is 100%. As a default, the alpha value for an object at the edge of the vision system has an alpha value of 20%.

In another embodiment, an icon representing the object may be displayed on the screen. The position of the icon may be computed such that the icon is placed at the edge of the screen on the imaginary line connecting the object's center and the center of the screen. Icons may be alpha-blended and resized to indicate an object's distance from the screen.

In another embodiment and similar to the above described icon, an arrow may be drawn at the edge of the screen pointing in the direction of the object. For example, thinner, longer arrows may indicate objects are further from the tablet screen. Other portions of the arrow may indicate object distance (e.g., the stem of an arrow becomes longer the farther away an object is).

In another embodiment, a callout (similar to a cartoon bubble) may indicate an object within the target area, including a tail pointing towards the off-screen object. The callout may further include a label and an icon. The callout may be further sized and alpha-blended to indicate an object's distance from the screen.

Figure 4:
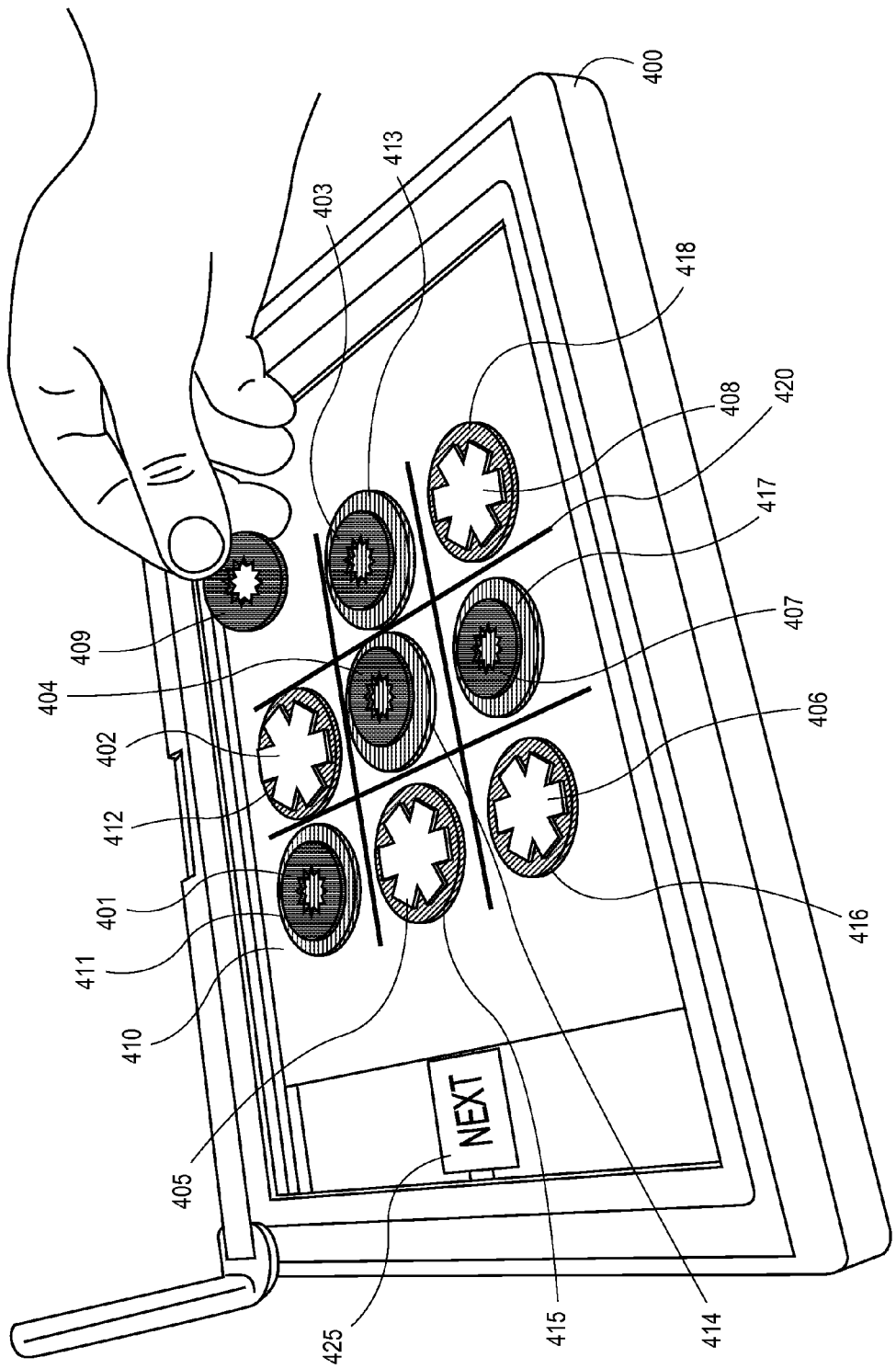
FIG. 4 is an illustration of an application utilizing an embodiment of the invention.

FIG. 4 is a diagram of an application utilizing an embodiment of the invention. The application of FIG. 4 demonstrates the ability to detect objects on tablet computer 400 and around it, and to make use of tablet screen 410. In this application, physical tokens 401-409 may be used by to play a game of tic-tac-toe on grid 420. The system recognizes tokens' 401-409 positions on screen 410 via a camera positioned above the screen to determine the state of the game-board and highlight tokens from underneath via images 411-418 (token 409 has not been placed on screen 410, and thus does not have a corresponding image on screen 410). In one embodiment, tokens that are off the screen may be identified and highlighted with icons at the periphery of screen 410 as described above.

In this embodiment, the application (i.e., the tic-tac-toe game) receives a command from the user to monitor the target area. For example, after placing game piece on grid 420, a user may hit NEXT button 425 displayed on screen 410 to indicate that they are finished with their turn. At this point, the application may observe the target area to check the state of the game board to ensure that objects on screen 410 are in compliance with the game (possible violations, such as moving an already-placed piece, removing an opponent's piece, playing two or more pieces on a turn, failing to play on a turn, covering an opponent's piece, and so on). Users may be notified of violations via sound and symbol displayed on screen 410 (e.g., buzzer sounds and red dashes marking an illegal move on grid 420).

Figure 5:
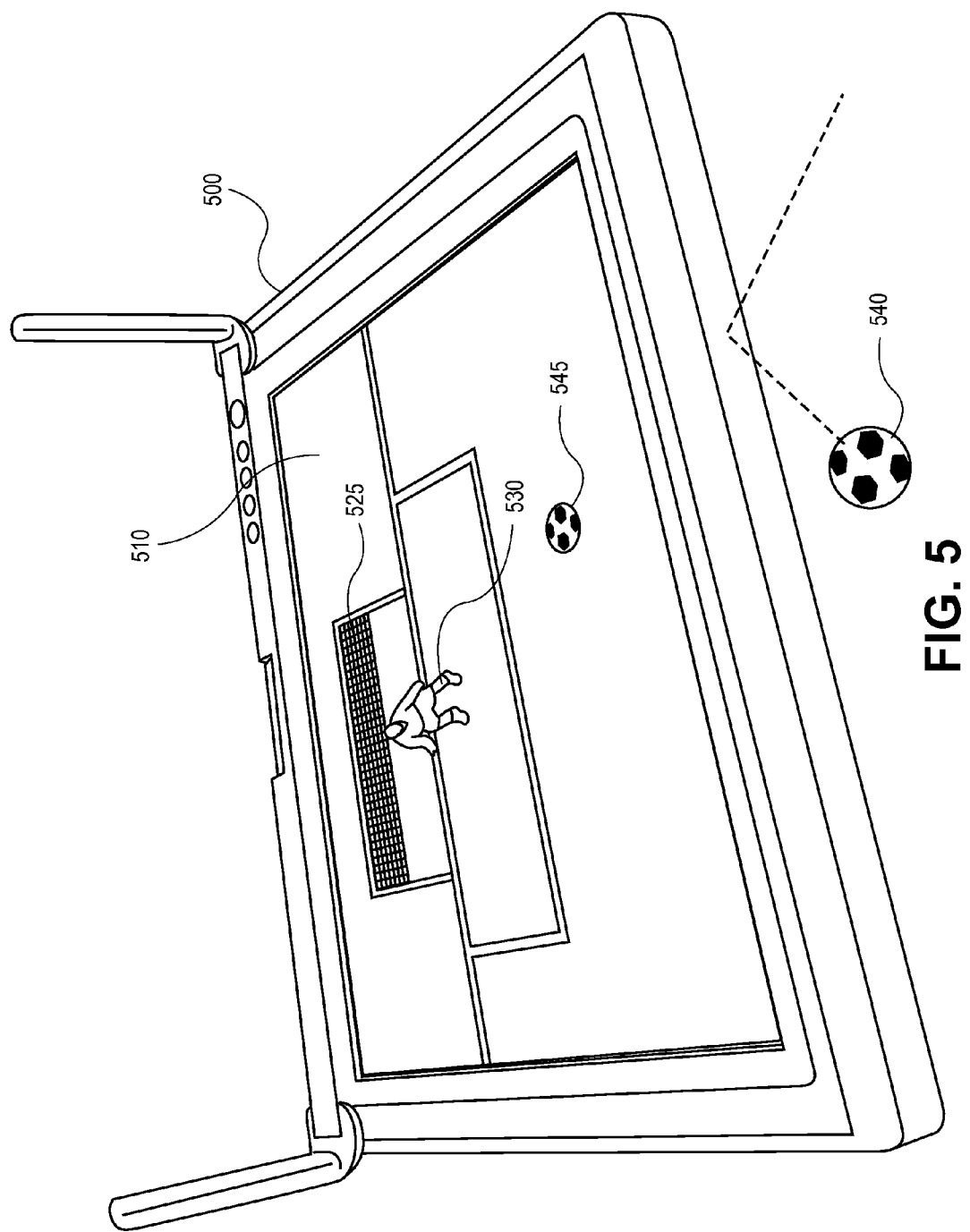
FIG. 5 is an illustration of an application utilizing an embodiment of the invention.

FIG. 5 is a diagram of an application utilizing an embodiment of the invention. The application of FIG. 5 illustrates the capability of detecting objects off screen 510 of tablet computer 500 as an input for the application. In this example, the application displays soccer goal 525 with goalie 530. A user may physically roll (or kick) small soccer-ball-shaped object 540 toward virtual on-screen goal 525. When object 540 hits the chassis of tablet 500, virtual ball 545 appears and flies toward goal 525 along the same trajectory as the incoming physical object. Goalie 530 tries to block the shot, favoring the side from which the shooter strikes.

This example application takes advantage of tablet 500 being raised from the ground so that physical object 540 may impact the tablet and then return, more or less, to the user. Velocity and acceleration in the physical world are used directly in physics equations to convert physical motion to virtual motion of virtual ball 545 on screen 510. In one embodiment, shots travel not just in two dimensions, but in a third dimension—above screen 510 whereby the size object 540 with respect to the camera above tablet 500 communicates its height from the ground. Thus, it would be possible to shoot over the goal as well as to the left or right of it.

The embodiment of the invention illustrated in FIG. 5 highlights the ability of embodiments of the invention to detect objects off tablet computer 500, track their velocity and trajectory, and react to them on screen 510.

Figure 6:
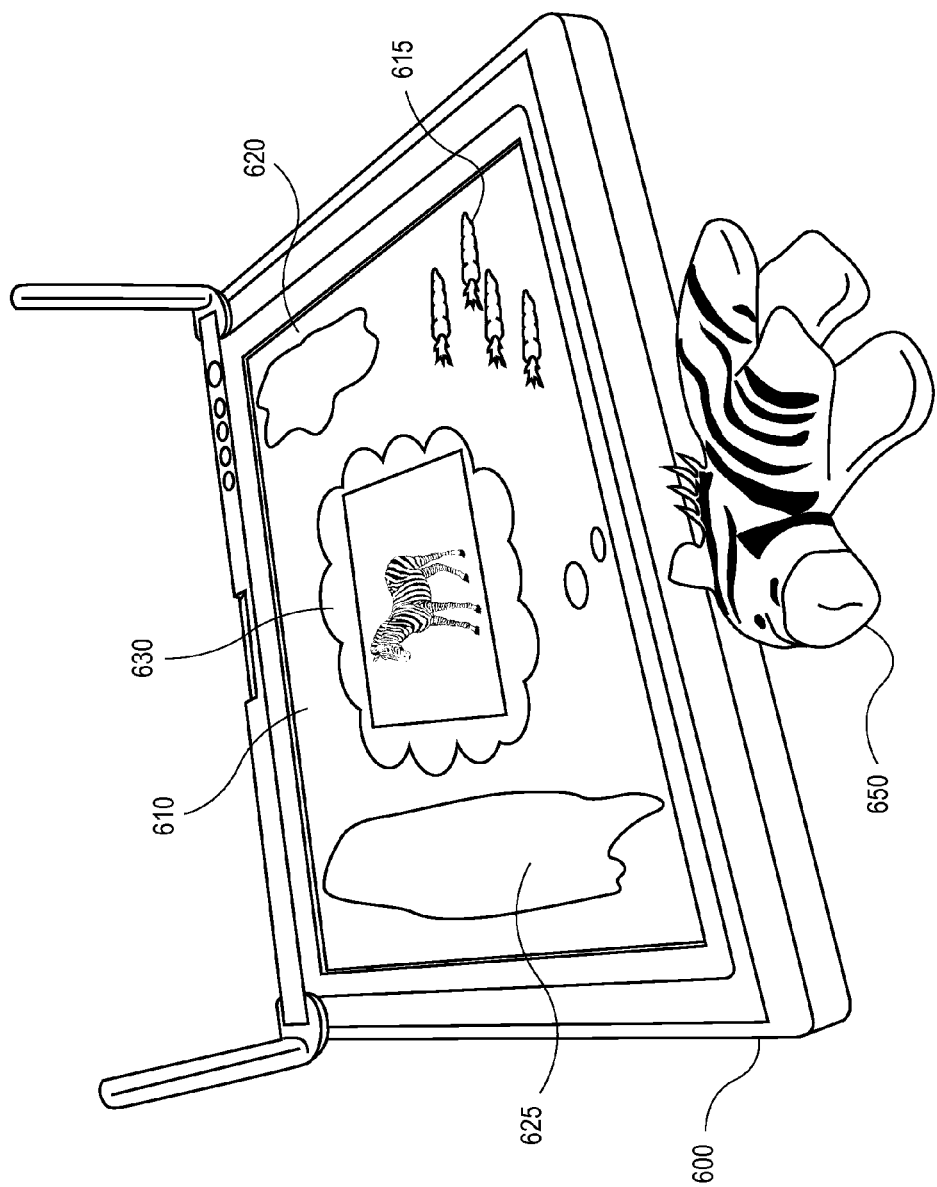
FIG. 6 is an illustration of an application utilizing an embodiment of the invention.

FIG. 6 is a diagram of an application utilizing an embodiment of the invention. The application of FIG. 6 allows a user to play with a physical object, in this example toy zebra 650, and have the application react to the state of the toy on, or around, tablet 600.

In this embodiment, toy zebra 650 may eat food 615 displayed on the screen 610, or drink from virtual pool of water 620 displayed on screen 610 (a timer may periodically replenish the pool of water) by placing the "head" of the toy on the displayed objects. Sand area 625 provides a place for toy zebra 650 to use the bathroom by placing the toy entirely on screen 610 within the sand area.

The physical orientation of zebra toy 650 also may be utilized by the application. Specifically, zebra toy 650 may go to sleep, as the application will distinguish between a standing zebra and a zebra lying down. For example, laying zebra toy 650 on its side in front of tablet 500 triggers a "dream" wherein a nature video of zebras in the wild plays above the zebra's head within cartoon bubble 630 on tablet screen 610. If zebra toy 650 is stood-up mid-dream, the dream immediately stops. Gesture tracking within the target area may also be tracked to enable actions such as petting to be recognized and rewarded. This application highlights the ability of embodiments of the invention to detect objects within the target area and process interactions with objects on screen 610 either off or on tablet computer 600.

Various components referred to above as processes, servers, or tools described herein may be a means for performing the functions described. Each component described herein includes software or hardware, or a combination of these. The components can be implemented as software modules, hardware modules, special-purpose hardware (e.g., Application Specific Integrated Circuits (ASICs), Digital Signal Processors (DSPs), etc.), embedded controllers, hardwired circuitry, etc. Software content (e.g., data, instructions, and configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A mobile tablet computer system comprising:
a tablet computer chassis;
a touchscreen display contained within the chassis, the touchscreen display including a surface with a surface linear polarizing filter;
a first arm and a second arm, a first end of the first arm being coupled with the chassis at a first location and a first end of the second arm being coupled with the chassis at a second location different from the first location, the first and second arms being extended upright from the first and second locations respectively relative to the touchscreen display surface;
a first camera positioned for a first camera view to capture visual data within a first target area, the first target area to include a first sub-area that includes the touchscreen display surface and a second sub-area that does not include the touchscreen display surface, the second sub-area being outside of and not on top of the touchscreen display surface, wherein the first camera is coupled with a second end of the first arm and includes a first linear polarizing filter to block view of the touchscreen display by the first camera;
a second camera positioned for a second camera view different from the first camera view to capture visual data within a second target area, the second target area to include a first sub-area that includes the touchscreen display surface and a second sub-area that does not include the touchscreen display surface, the second sub-area being outside of and not on top of the touchscreen display surface, wherein the second camera is coupled with a second end of the second arm and includes a second linear polarizing filter to block view of the touchscreen display by the second camera, the second sub-area of the first target area and the second sub-area of the second target area including an overlapping target area visible by both the first camera view and the second camera view, wherein the mobile tablet computer system is to be calibrated such that an object viewed by first camera view and the second camera view in the overlapping target area is reported as a single object;
a processor; and
software to be executed via the processor to:
generate a first graphical image to be displayed on the touchscreen display,
identify, from the captured visual data from the first camera and the second camera, a physical object other than the touchscreen display surface that is within the first target area visible to the first camera or the second target area visible to the second camera, including the overlapping target area visible to both the first camera and the second camera,
determine coordinates of a location of the detected physical object using the first view of the first camera, the second view of the second camera, or both the first view of the first camera and the second view of the second camera,
process an interaction between the physical object and the first graphical image, said interaction being based upon one or more of location, height, velocity, acceleration, gesture, and physical orientation of the physical object in the overlapping target area with respect to the first graphical image, and
generate and display a second graphical image on the touchscreen display, the second graphical image including a graphical representation of the interaction between the physical object and the first graphical image.

2. The mobile tablet computer system of claim 1, the software to further continuously monitor the first and second target areas, including the overlapping target area, to identify physical objects within the first and second target areas.

3. The mobile tablet computer system of claim 1, the software to further receive a command to monitor the first and second target areas, including the overlapping target area.

4. The mobile tablet computer system of claim 1, wherein the software is to generate the second graphical image based, at least in part, on at least one of a distance, an angle, and an orientation between the physical object and the touchscreen display surface.

5. The mobile tablet computer system of claim 1, wherein the apparatus further comprises:
a bezel surrounding the touchscreen display surface;
wherein the second sub-area of the first and second target areas includes the bezel surrounding the touchscreen display surface.

6. The mobile tablet computer system of claim 1, wherein the second sub-area of the first and second sub-areas includes an area of a supporting surface of a platform.

7. The mobile tablet computer system of claim 1, wherein the first and second arms are rotationally extendable arms.

8. The mobile tablet computer system of claim 1, wherein the representation of the interaction includes a virtual image of the physical object on the touchscreen display.

9. The mobile tablet computer system of claim 8, wherein the virtual image of the physical object includes virtual motion of the virtual image, the virtual motion representing a physical motion of the physical object.

10. The mobile tablet computer system of claim 1, wherein the first graphical image is not viewable by the first camera or the second camera because of alignment of the first camera linear polarizing filter and the second linear polarizing filter in relation to the surface linear polarizing filter.

11. The mobile tablet computer system of claim 1, wherein the first linear polarizing filter and the second linear polarizing filter are rotatable for alignment in relation to the surface linear polarizing filter.

12. An article of manufacture comprising a machine-readable non-transitory storage medium that provides instructions that, if executed by the machine, will cause the machine to perform operations comprising:
capturing visual data within an overlapping target area via a first camera and a second camera, the first camera and second camera being coupled respectively to first arm coupled with a chassis of a mobile tablet computer system at a first location and a second arm coupled with the chassis of the mobile tablet computer system at a second location different from the first location, the first and second arms being extended upright from the first and second locations respectively relative to a surface of a touchscreen display of the mobile tablet computer system, the touchscreen display including a surface linear polarizing filter, the first camera being positioned for a first view and including a first linear polarizing filter to block view of the touchscreen display by the first camera, the second camera being positioned for a second view different from the first view and including a second linear polarizing filter to block view of the touchscreen display by the second camera, each of a first target area for the first camera and a second target for the second camera to include a first sub-area that includes the touchscreen display surface of the mobile computer system and a second sub-area that does not include the touchscreen display surface, the second sub-areas of the first and second target areas being outside of and not on top of the touchscreen display surface, the overlapping target area being an area overlapping between the second sub-area of the first target area for the first camera and the second sub-area of second target area for the second camera, wherein the mobile tablet computer system is to be calibrated such that an object viewed by first camera view and the second camera view in the overlapping area is reported as a single object;
generating a first graphical image;
displaying the graphical image on the touchscreen display;
identifying, from the captured visual data from the first camera and the second camera, a physical object other than the touchscreen display surface that is within the overlapping target area visible to the first camera, the second camera, or both the first and second cameras;
determining coordinates of a location of the detected physical object in the overlapping target area using the first view of the first camera, the second view of the second camera, or both the first view of the first camera and the second view of the second camera;
processing an interaction between the physical object and the first graphical image, said interaction being based upon one or more of location, height, velocity, acceleration, gesture, and physical orientation of the physical object in the overlapping target area with respect to the first graphical image; and
generating and displaying a second graphical image on the touchscreen display, the second graphical image including a graphical representation of the interaction between the physical object and the first graphical image.

13. The article of manufacture of claim 12, the operations further comprising continuously monitoring the first and second target areas, including the overlapping target area, to identify physical objects within the target areas.

14. The article of manufacture of claim 13, the operations further comprising receiving a command to monitor the first and second target areas, including the overlapping target area.

15. The article of manufacture of claim 13, wherein generating the second graphical image is based, at least in part, on at least one of a distance, an angle, and an orientation between the physical object and the touchscreen display surface.

16. A method comprising:
capturing visual data within an overlapping target area via a first camera and a second camera, the first camera and second camera being coupled respectively to first arm coupled with a chassis of a mobile tablet computer system at a first location and a second arm coupled with the chassis of the mobile tablet computer system at a second location different from the first location, the first and second arms being extended upright from the first and second locations respectively relative to a surface of a touchscreen display of the mobile tablet computer system, the touchscreen display including a surface linear polarizing filter, the first camera being positioned for a first view and including a first linear polarizing filter to block view of the touchscreen display by the first camera, the second camera being positioned for a second view different from the first view and including a second linear polarizing filter to block view of the touchscreen display by the second camera, each of a first target area for the first camera and a second target area for the second camera to include a first sub-area that includes the touchscreen display surface of the mobile computer system and a second sub-area that does not include the touchscreen display surface, the second sub-areas of the first and second target areas being outside of and not on top of the touchscreen display surface, the overlapping target area being an area overlapping between the second sub-area of the first target area for the first camera and the second sub-area of second target area for the second camera, wherein the mobile tablet computer system is to be calibrated such that an object viewed by first camera view and the second camera view in the overlapping area is reported as a single object;

generating a first graphical image;

displaying the graphical image on the touchscreen display;

identifying, from the captured visual data from the first camera and the second camera modified by the background/foreground mask, a physical object other than the touchscreen display surface that is within the overlapping target area visible to the first camera, the second camera, or both the first and second cameras;

determining coordinates of a location of the detected physical object in the overlapping target area using the first view of the first camera, the second view of the second camera, or both the first view of the first camera and the second view of the second camera;

processing an interaction between the physical object and the first graphical image, said interaction being based upon one or more of location, height, velocity, acceleration, gesture, and physical orientation of the physical object in the overlapping target area with respect to the first graphical image; and generating and displaying a second graphical image on the touchscreen display, the second graphical image including a graphical representation of the interaction between the physical object and the first graphical image.

* * * * *